United States Patent [19]

Hellbusch

[11] Patent Number: 4,740,653
[45] Date of Patent: Apr. 26, 1988

[54] ELECTRICAL CABLE SPLICE ENCLOSURE

[75] Inventor: Dieter Hellbusch, Seevetal, Fed. Rep. of Germany

[73] Assignee: Minnesota Mining and Manufacturing Company, St. Paul, Minn.

[21] Appl. No.: 938,565

[22] Filed: Dec. 5, 1986

[30] Foreign Application Priority Data

Jan. 24, 1986 [DE] Fed. Rep. of Germany ....... 3602150

[51] Int. Cl.$^4$ ............................................. H02G 15/24
[52] U.S. Cl. .................... 174/21 R; 174/76; 174/84 R; 174/92
[58] Field of Search ............... 174/10, 21 R, 76, 84 R, 174/84 C, 92

[56] References Cited

U.S. PATENT DOCUMENTS

| | | | |
|---|---|---|---|
| 2,958,723 | 11/1960 | Logan et al. | 174/84 C |
| 3,187,088 | 6/1965 | Warner | 174/84 R |
| 3,419,669 | 12/1968 | Dienes | 174/76 |
| 3,499,972 | 3/1970 | Smith | 174/76 |
| 3,519,728 | 7/1970 | Gillemot | 174/84 R |
| 3,879,574 | 4/1975 | Filreis et al. | 174/76 |
| 4,358,634 | 11/1982 | Dienes | 174/92 X |
| 4,533,788 | 8/1985 | Pokojny et al. | 174/92 X |

FOREIGN PATENT DOCUMENTS

| | | | |
|---|---|---|---|
| 0017953 | 10/1982 | European Pat. Off. | |
| 2909606 | 4/1981 | Fed. Rep. of Germany. | |
| 3021845 | 3/1983 | Fed. Rep. of Germany. | |
| 406410 | 3/1934 | United Kingdom | 174/5 R |
| 2129230 | 5/1984 | United Kingdom | 174/92 |

Primary Examiner—Morris H. Nimmo
Attorney, Agent, or Firm—Donald M. Sell; James A. Smith; Terryl K. Qualey

[57] ABSTRACT

An electrical medium voltage cable connection enclosure for an oil-filled, paper-insulated cable has a spacer body arranged between a core connection area and a shielding enclosure. The spacer body is a prefabricated, resilient, open-pore foam material body which has an air-free filler of electricity insulating, flowable, impregnating compound and is longitudinally split and put under a resilient pressing force by the shielding enclosure.

6 Claims, 2 Drawing Sheets

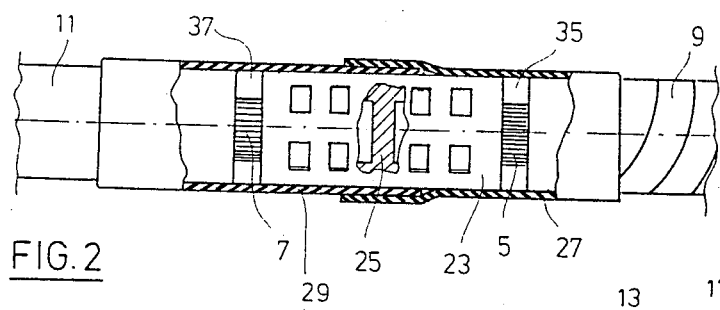
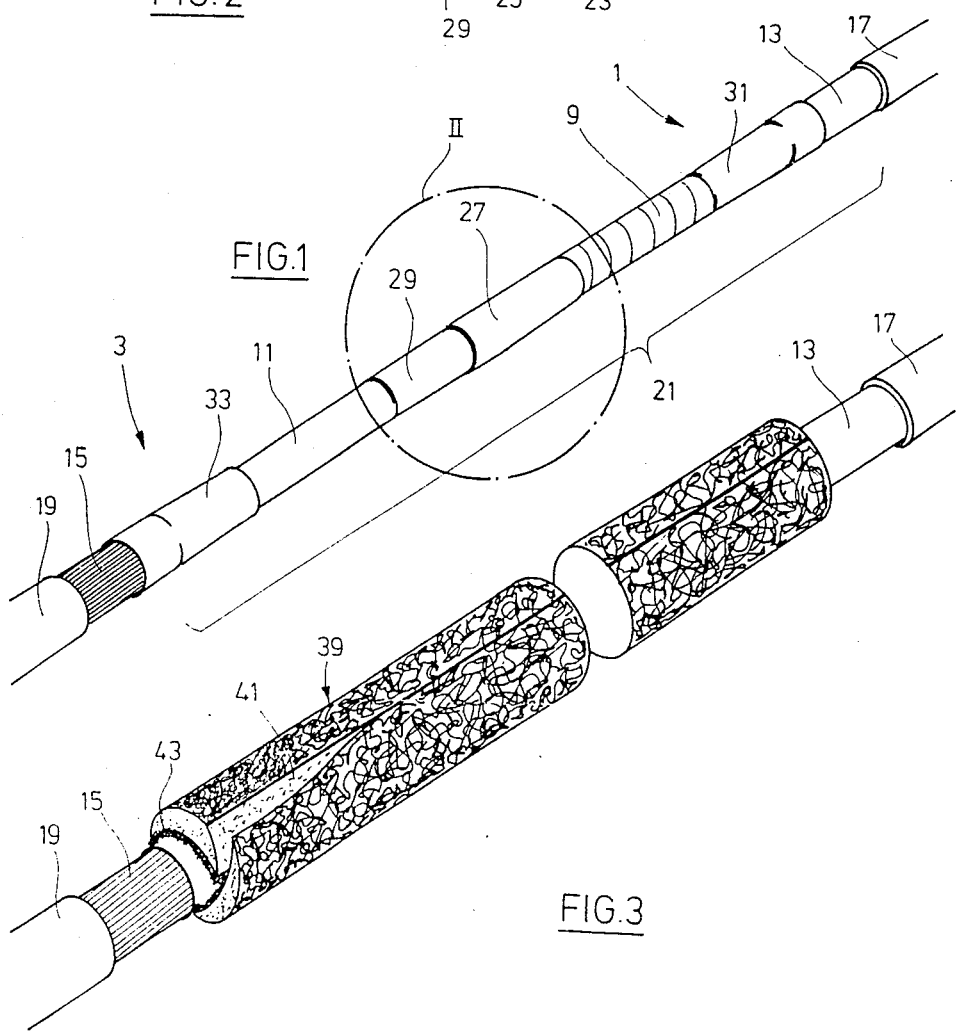

ELECTRICAL CABLE SPLICE ENCLOSURE

TECHNICAL FIELD

The invention relates to an enclosure for a medium voltage electrical cable connection.

BACKGROUND ART

In connections of medium voltage electrical cables, gaps or interstices must not be present in the insulating material surrounding the core connection or electrical stresses can degrade and destroy the connection. This requirement must be met under varying operating conditions over long time periods of operation. Particular difficulties are encountered with oil-filled, paper-insulated medium voltage cables because the oil level thereof may undergo changes during manufacture of the cable connection or in use, and because the paper insulation which normally is wrapped, is delicate and can be easily damaged.

Cast spacer bodies are often used as the insulating material surrounding a core connection. They are manufactured at the site of installation in a mold placed around the core connection. That technique is, however, expensive in time and labor and requires a relatively large amount of casting compound. Yet this will not completely eliminate the danger that gaps and interstices will form during operation; and this is particularly true at the boundary between the casting compound and the oil in oil filled cables.

West German Offenlegungsschrift Nos. 29 09 060 and 30 21 845 and European Pat. No. 0017953 disclose medium voltage electrical cable connections for oil-filled paper-insulated medium voltage cables in which the end of one cable is arranged in a hermetically sealed metal casing which is filled with oil or casting compound. That cable is connected via a hermetically sealed insulated plug connection with the second cable which is normally a plastic-insulated cable. That technique is also very expensive.

In another cable connection for an oil-filled cable, heat-shrinkable sleeves are used for making oil-tight connections. However, in that method the heating that is necessary for the shrinking causes thermal expansion of the oil thereby creating an oil loss in the end portion of the oil-filled cable. Undesirable cavities may form where the oil loss occurs. Also, the necessity to employ a heat source which can be easily handled, normally in the form of an open flame, is often inconvenient or inadmissible. Finally, the manufacture of such cable connections requires considerable experience and skill of the assembling personnel, and the quality of the result of the work is highly dependent upon the personal abilities of the installer.

DISCLOSURE OF INVENTION

The present invention provides a medium voltage electrical cable connection enclosure for two cables each of which comprises a core having a core conductor and an electrically insulating and sealing cable sheath, end portions of the core conductors being exposed in a core connection area and being electrically interconnected. The enclosure includes an electrically insulating spacer body for surrounding the core connection and a spacer body enclosure for surrounding the spacer body. The spacer body is formed of a resilient open-pore foam material which is filled in an air-free manner with an electrically insulating, flowable, impregnating compound, and it has a longitudinal slit and thereby is adapted to be placed onto the throughgoing cable core connection area. The spacer body enclosure is formed to exert a resilient pressing force on the foam material spacer body.

In the cable connection according to the invention, the spacer body is a simple structural part which due to its longitudinal slit can be simply placed around the cable connection area and will then ensure the proper spacing from the connection of the parts which are arranged farther outwards. Since a resilient pressing force is exerted on the spacer body, impregnating compound will exit into the boundary surfaces, particularly in the longitudinal slit, such that all air gaps and interstices are filled and the impregnating compound will form a resiliently biased gap-free contact with the core connection and, in the case of oil-filled cables, to the oil filler of the cable. The spacer body which is filled with impregnating compound and resiliently pressed will adapt itself to surface irregularities and will form a supply of impregnating compound for possible deformations and, in the case of oil-filled cables, possible shifts and changes of the oil level.

BRIEF DESCRIPTION OF DRAWING

In the drawing:

FIG. 1 is a perspective view of the interior parts of a cable connection according to the invention;

FIG. 2 is an axial sectional view of the area II of FIG. 1;

FIG. 3 illustrates, in a perspective view similar to FIG. 1, the application of the foam material spacer body;

BEST MODE FOR CARRYING OUT THE INVENTION

Figure 4:
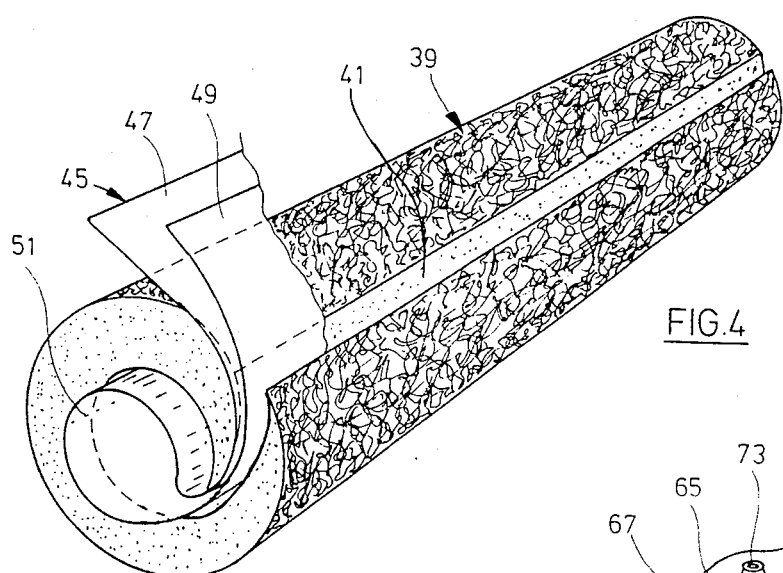
FIG. 4 shows, on a scale which is enlarged as compared to FIG. 3, a foam material spacer body having an inner sheet of plastic to aid in installation.

FIGS. 1 and 2 show interior parts of a cable connection for two electrical cables 1, 3, each of which comprises a core having a core conductor 5 and 7, respectively, a core insulation 9 and 11, respectively, surrounding the core conductor, an electrically conductive shield 13 and 15, respectively, surrounding the core insulation, and an electrically insulating, sealing cable sheath 17 and 19, respectively, surrounding the shield. In a core connecting area 21, end portions of the core conductors 5, 7, the core insulations 9 and 11, respectively, and the shields 13 and 15, respectively, are exposed, and the end portions of the core conductors 5, 7 are electrically interconnected through a connector 23. In the embodiment illustrated, the cable 1 is an oil-filled medium voltage cable having a wrapped paper core insulation 9, and the cable 3 is plastic-insulated and accordingly has a plastic core insulation 11. The connector 23 has an oil sealing interior wall 25, and a pair of electrically semiconductive electrodes 27, 29 each extends sealingly and with a field-smoothening action from one of the core insulations 9 and 11, respectively, to the connector 23. In the embodiment illustrated, these electrodes 27, 29 are designed as prefabricated structural parts of oil-resistant, permanently resilient material and fit overlappingly under resilient tension.

Stress control elements 31, 33 are also provided for each of the cables 1, 3, which in the usual manner extend from the exposed end portion of the core insulation 9 or 11, respectively, to the exposed end portion of the shield 13 or 15, respectively. In the embodiment illustrated, these stress control elements are designed as prefabricated structural parts of permanently resilient material.

FIG. 2 illustrates that because of the presence of electrodes 27, 29, pencilling of the core insulations 9, 11 is not necessary; it is sufficient that the insulation is simply cut perpendicular to the core. The interstices 35 and 37 within the electrodes 27 and 29, respectively, are electrically meaningless; however, preferable to make them as small as possible, particularly in the case of oil-filled cables, to avoid the creation of space for the exiting of oil. In FIG. 2, the interstices 35 and 37 are shown with an exaggerated size for clarity.

FIG 3 shows that as the next step in the making of the illustrated cable connnection, the a hollow-cylindrical resilient foam material spacer body 39 is applied. The spacer body has a longitudinal slit 41 to permit it to be placed onto the throughgoing core connection area 21. In FIG. 3, the longitudinal slit 41 is shown apart at its left end for clarity; it being understood, however, that the foam material spacer body 39 will close resiliently around the core connection area 21. The longitudinal slit 41 extends in a curved cutting surface which in cross-section merges generally tangentially with the interior and exterior circumferential surfaces of the foam material spacer body 39. The curved cutting surface of the longitudinal slit 41 permits good surface contact along the cutting surface over a range of different diameters of the enclosed core connection area 21.

The foam material spacer body 39 is open-pored and filled with a flowable impregnating compound 43 to be free of air. The impregnating compound 43 is selected so that it is compatible with the cable oil of the cable 1 and will not leak from the foam material spacer body 39 at room temperature because of its viscosity and its adhesion to the foam material spacer body 39. Particularly suitable as an impregnating compound is gelled oil which is flowable at the normal operating temperature of the cable connection, for instance about 65° C.

FIG. 4 shows the foam material body 39 enlarged with respect to FIG. 3, prior to its application to the core connecting area 21. A plastic sheet 45 extends around the hollow interior of the spacer body 39 and has gripping portions 47, 49 projecting through the longitudinal slit 41. The plastic sheet has a central line of fatigue 51, for instance a perforation line, parallel to the axis of the spacer body. During assembly, the core connection area 21 is introduced between the gripping portions 47, 49 through the longitudinal slit 41 into the interior space of the foam material body 39. Then, by drawing at the gripping portions 47, 49, the plastic sheet 45 is torn at the perforation line and drawn out. In doing so, the inner circumferential surface of the foam material body 39 will make a smooth and tight fit on the core connection area 21.

Figure 5:
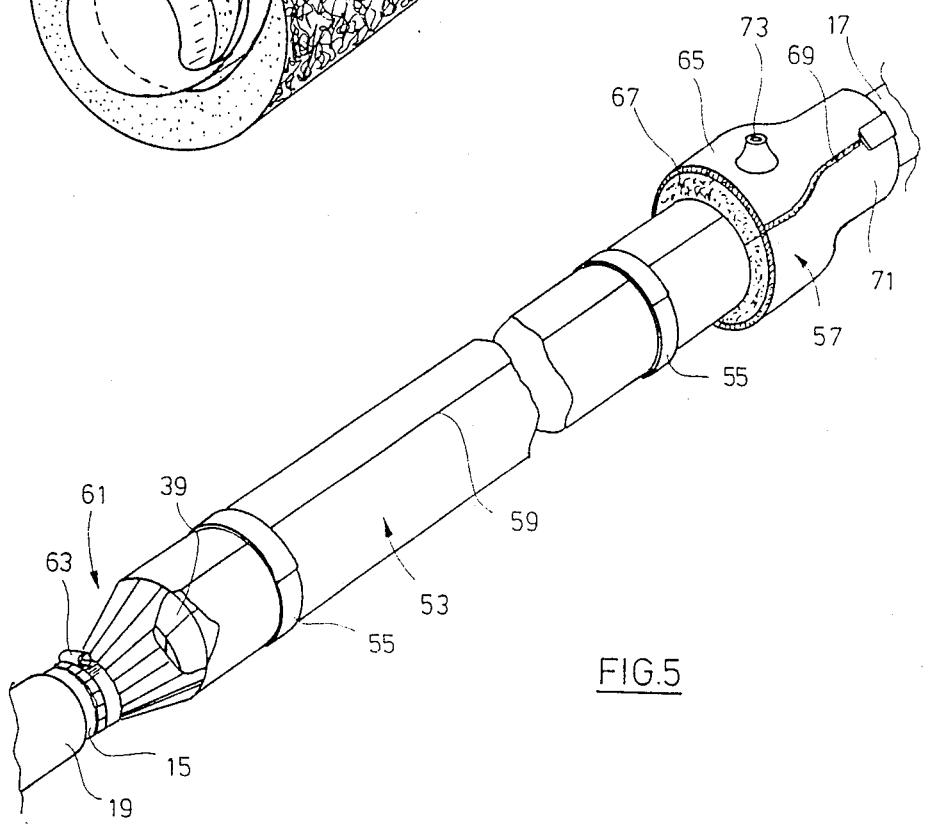
FIG. 5 illustrates, in a perspective view, a finished cable connection, with only a portion of the sealing enclosure being shown.

FIG. 5 illustrates the finished cable connection. Starting from the condition illustrated in FIG. 4, a longitudinally split shielding enclosure 53 is placed around the spacer body 39, closed and resiliently tightened in the circumferential direction by tightening means 55, and electrically connected to the shields, 15 (in FIG. 5, only the shield 15 of the second cable 3 can be seen). In the illustrated embodiment, spring rings 55 are provided as resilient tightening means. By the tightening, the foam material spacer body 39 which is filled with impregnating compound is put under a resilient pressing force. This will ensure that impregnating compound will fill, without gaps, the spaces along all boundary surfaces. Thereafter, a longitudinally split sealing enclosure 57 is placed around the shielding enclosure 53, closed under resilient tension, and sealed to the cable sheaths 17, 19. In the illustrated embodiment, as a final step, the sealing enclosure 57 is filled with a casting compound which remains deformable in the hardened condition. In FIG. 5, only a fraction of the sealing enclosure 57 is shown at the right-hand end.

The shielding enclosure 53 and the sealing enclosure 57 are designed as prefabricated structural parts so that they need be only attached at the place of installation. In the illustrated embodiment, the shielding enclosure 53 is designed as a metal collar which can be resiliently tightened in the circumferential direction, and which can be resiliently spread manually along its longitudinal seam 59 so that it can be placed around the throughgoing core connecting area 21. The illustrated shielding enclosure has tapering, longitudinally split axial end portions, for instance 61, which are designed to contact the cable shields. In FIG. 5, only the contacting at the shield 15 of the second cable 3 can be seen; for this purpose, tightening means 63, here in the form of a clamp, are provided which can be tightened in the circumferential direction.

The sealing enclosure 57 is an elastic rubber sheet 65 which is covered on its inner side with a spacer material 67 permeable by casting compound, and which can be closed under elastic tension along a longitudinal seam 69 by means of a zipper closure. Marginal portions 71 of the sealing enclosure 57 are tapered and dimensioned so that they can be closed with a resilient tension around the cable sheaths 17. An opening 73 is provided for introduction of a casting compound which permeates the spacer material 67 and after its hardening forms a reliable seal to the cable sheaths 17, 19. The casting compound is selected so that it retains a certain pliability after the hardening, whereby the sealing enclosure 57 can adapt itself to possible deformations which for instance are caused thermally, and can provide a contribution to the resilient pressing of the foam material body 39.

I claim:

1. A medium voltage electrical cable connection enclosure for two cables each of which comprises a core having a core conductor and an electrically insulating and sealing cable sheath, end portions of the core conductors being exposed in a core connection area and being electrically interconnected, comprising:

an electrically insulating spacer body for surrounding the core connection, said spacer body being formed of a resilient open-pore foam material which, prior to installation around the core connection, is filled in an air-free manner with an electrically insulating, flowable, impregnating compound which at room temperature will not leak from the open foam material spacer body because of its viscosity and its adhesion to the foam material spacer body, which spacer body has a longitudinal slit and thereby is adapted to be placed onto the throughgoing core connection area, and a spacer body enclosure for surrounding the spacer body, said spacer body enclosure being formed to exert a resilient pressing force on the foam material spacer body.

2. The cable connection enclosure of claim 1 wherein the longitudinal slit in the spacer body extends through the wall of the spacer body as a curved cutting surface which in cross section merges generally tangentially with the interior and exterior circumferential surfaces of the spacer body.

3. The cable connection enclosure of claim 1 in which at least one cable to be connected is oil filled, wherein the impregnating compound is an impregnating oil that is compatible or identical with the cable oil within the cable to be connected.

4. The cable connection enclosure of claim 3, wherein the impregnating oil is gelled.

5. The cable connection enclosure of claim 1 wherein a plastic sheet extends around the hollow interior of the spacer body and has gripping portions projecting through the longitudinal slit.

6. The cable connection enclosure of claim 5 wherein the plastic sheet is perforated in a direction parallel to the axis of the spacer body centrally within the hollow interior of the spacer body.

* * * * *